United States Patent [19]

Thorndyke

[11] Patent Number: 4,930,612

[45] Date of Patent: Jun. 5, 1990

[54] ROLLER TRACK ASSEMBLY INCORPORATING A MECHANICAL ELEVATOR MECHANISM

[75] Inventor: Robert J. Thorndyke, Oshawa, Canada

[73] Assignee: Atlantis Transportation Services Inc., Oshawa, Canada

[21] Appl. No.: 274,961

[22] Filed: Nov. 22, 1988

[51] Int. Cl.⁵ ............................................ B65G 13/00
[52] U.S. Cl. .................. 193/35 SS; 414/535
[58] Field of Search .............................. 198/782, 774; 193/35 SS; 414/535

[56] References Cited

U.S. PATENT DOCUMENTS 2,057,367 10/1936 Cone ..................................... 198/774
3,168,205 2/1965 Green ..................................... 414/535
4,089,399 5/1978 Webb ............................... 193/35 SS

FOREIGN PATENT DOCUMENTS 481359 3/1938 United Kingdom ................ 414/535

Primary Examiner—Joseph E. Valenza
Attorney, Agent, or Firm—Fetherstonhaugh & Co.

[57] ABSTRACT

An elevating roller track assembly having a base member and a lift bar located in a channel which is formed in the base member. The lift bar is slidably mounted for longitudinal movement relative to the base member. A first elevator ramp is mounted on the lift bar. The first ramp has a first ramp face which is inclined upwardly toward a first end of the base member. A roller support member is slidably mounted in the base for longitudinal movement. The roller support member has a bottom wall overlying the lift bar. A plurality of load supporting rollers are mounted for rotation on and extending upwardly from the roller support member. A second elevator ramp is mounted on the bottom wall of the roller support. The second elevator ramp has a second ramp face which extends parallel to the first ramp face in a face-to-face relationship therewith. A drive mechanism is provided for driving the lift bar to and fro with respect to the base member to cause the first and second ramp faces to slide over one another to raise or lower the roller support member and its associated rollers as required in use.

1 Claim, 3 Drawing Sheets

ROLLER TRACK ASSEMBLY INCORPORATING A MECHANICAL ELEVATOR MECHANISM

BACKGROUND OF INVENTION

This invention relates to roller conveyor systems. In particular, this invention relates to roller conveyors which incorporates an elevator mechanism for raising and lowering the rollers.

FIELD OF INVENTION

Roller systems which incorporate an elevator system are well known. The elevator system which is commonly used in roller conveyor systems which are mounted on the bed of a truck employs a pneumatic elevator device. These devices have been in use for many years and incorporate an inflatable bladder which when inflated will serve to raise the rollers to an operating position and when deflated will serve to lower the rollers. The rollers are raised and lowered with respect to the floor of a truck or the like in order to facilitate the movement of cargo along the truck when they are in the raised position while permitting the load to rest securely upon the floor of the truck when the rollers are in the lowered position. The problem with the inflatable system presently in use is that these mechanisms are subjected to rugged use in a hostile environment and there is a danger that the inflatable bladder may be punctured because of the exposure to this hostile environment.

SUMMARY OF INVENTION

I have found that it is possible to provide a simple, inexpensive and highly reliable elevator mechanism in a conveyor roller assembly without the need to use an inflatable bladder.

It is an object of the present invention to provide a simple and inexpensive mechanical elevator mechanism in a roller conveyor system.

According to one aspect of the present invention, an elevating roller track assembly comprises a base member having first and second ends, a longitudinally elongated channel formed in said base member, said channel having a bottom wall, a pair of oppositely disposed side walls and an open upper end, a lift bar located in said channel and slidably mounted on said bottom wall for longitudinal movement relative to the base member, first elevator ramp means on said lift bar, said first ramp means having a first ramp face which is inclined upwardly toward the first end of the base member, a roller support member slidably mounted in said channel for longitudinal movement therein, said roller support member having a bottom wall overlying said lift bar, a plurality of load supporting rollers mounted for rotation on and extending upwardly from said roller support member, second elevator ramp means on said bottom wall of said roller support, said second elevator ramp means having a second ramp face which extends parallel to said first ramp face in a face-to-face relationship therewith, drive means for driving the lift bar to and fro with respect to the base member to cause said first and second ramp faces to slide over one another to raise or lower the roller support member and its associated rollers as required in use.

BRIEF DESCRIPTION OF THE DRAWINGS

The invention will be more clearly understood after reference to the following detailed specification read in conjunction with the drawings wherein.

Figure 1:
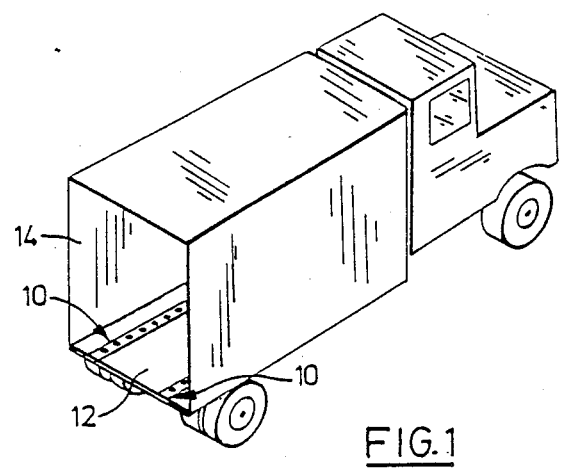
FIG. 1 is a pictorial view illustrating a van having roller conveyors of the type of the present invention mounted in the floor thereof.
Figure 2:
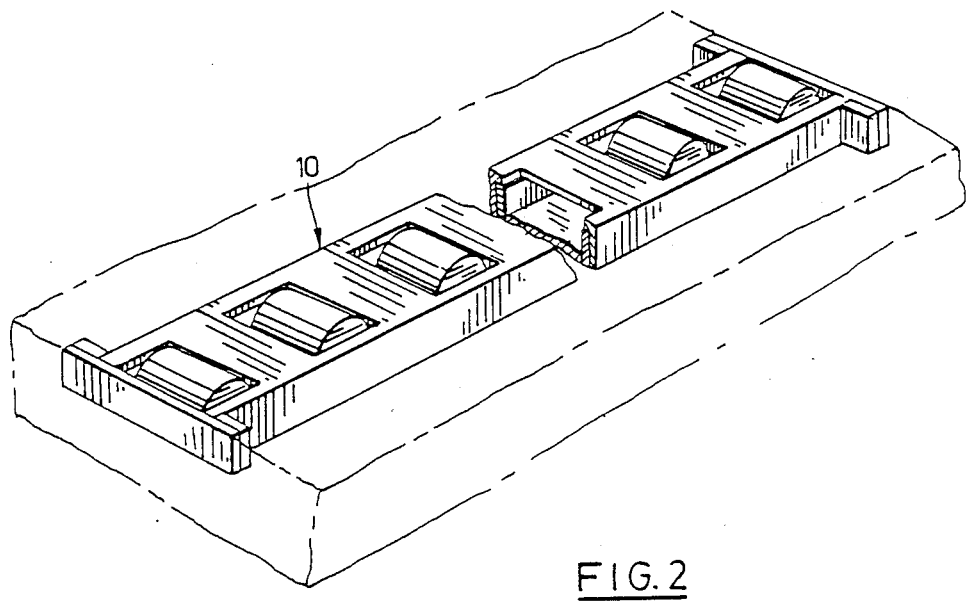
FIG. 2 is a pictorial view of a roller conveyor assembly constructed in accordance with an embodiment of the present invention.

With reference to the drawings, the reference numeral 10 refers generally to a roller assembly constructed in accordance with an embodiment of the present invention. As indicated in FIG. 1 of the drawings, the roller assemblies 10 may be positioned on the floor 12 of a van 14 for use in transporting loads into and out of the van.

Figure 3:
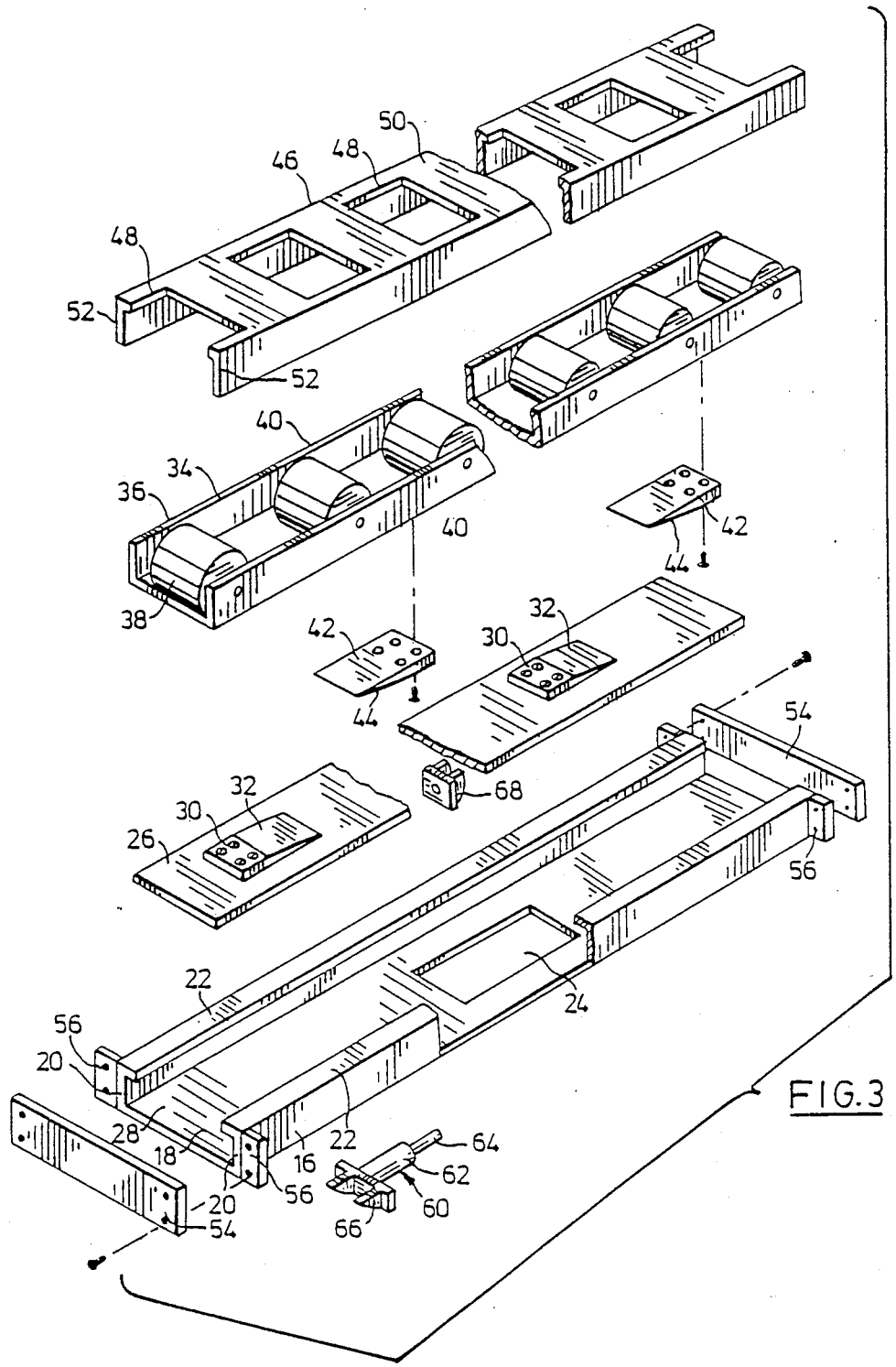
FIG. 3 is an exploded view of the assembly of FIG. 2.

As shown in FIG. 3 of the drawings, the roller assembly has a base channel member 16 which has a bottom wall 18, a pair of oppositely disposed side walls 20 and flanges 22 which project laterally inwardly from the upper end of the side walls 20. A passage 24 opens through the bottom wall 18.

A lifting bar 26 is proportioned to fit in the channel 28 so as to rest in a face-to-face sliding relationship on the bottom wall 18 for longitudinal movement relative to the base member 16.

A plurality of first elevator ramps 30 are mounted on the upper face of the lifting bar 26. The ramps 30 each have a ramp face 32 which is inclined upwardly toward one end of the lift bar.

A roller support member 34 is provided in the form of a U-shaped channel member 36 in which rollers 38 are mounted for rotation so that an arcuate portion of the periphery of each roller 38 will project above the upper edges 40 to the channel member 36. A plurality of second elevator ramps 42 are mounted on the underside of the channel member 36. Each of the ramp members 42 has a second ramp face 44 which extends parallel to the first ramp face 32 of the first ramp members 30. The roller support member 34 with the second elevator ramps 42 attached thereto is mounted in the channel 28 so that the second ramp members 42 rest on the lift bar with the ramp faces 44 arranged in a face-to-face relationship with respect to the ramp faces 32.

A cover 46 is formed with a plurality of apertures 48 in the upper wall 50. The cover 46 has short side walls 52 which extend downwardly from the top wall and are arranged to overlie the side walls 20 of the face member 16. The apertures 48 are proportioned to permit a segment of each roller 38 to project upwardly therethrough when the roller support member or cage 34 is elevated.

Opposite ends of the base member 18 are closed by end plates 54 which are releaseably attached to the flanges 56 which project laterally from opposite sides of the base member 16.

The drive mechanism which is used for moving the lift bar 26 comprises an extensible ram assembly 60 which includes a cylinder 62 and a shaft 64. One end of the cylinder 62 is connected to a mounting bracket 66 which is attached to the underside of the bottom wall 18 of the base member 16. The shaft 64 is mounted in a bracket 68 which is attached to the underside of the lift bar 26.

Figure 4:
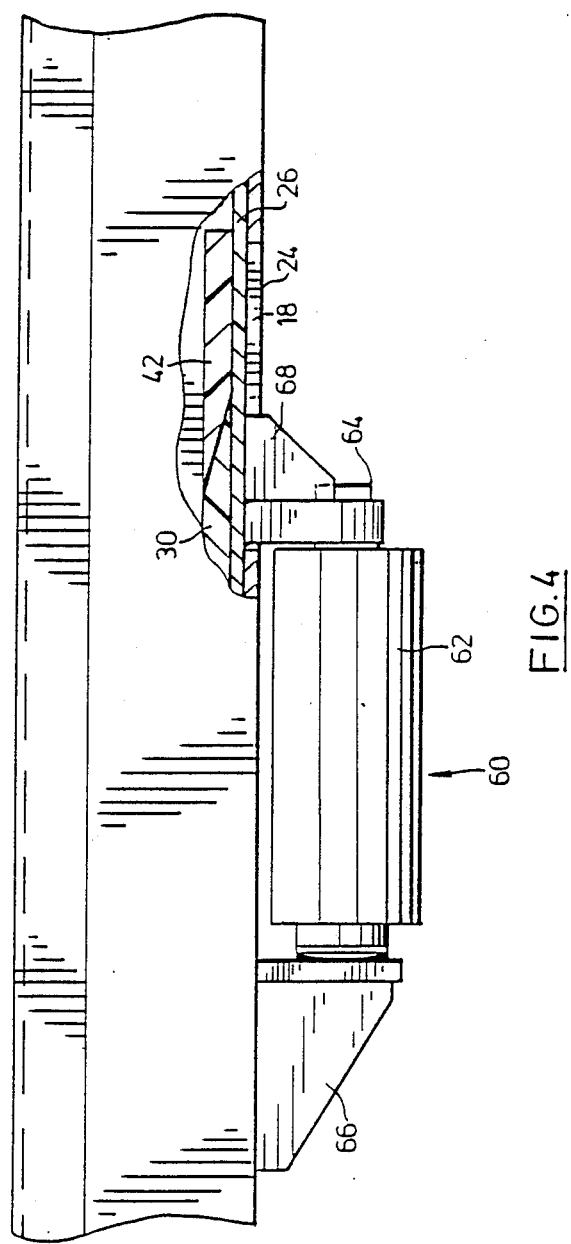
FIG. 4 is a partially sectioned side view of a portion of a roller assembly.

By extending the ram 60, the shaft 64 will move the bracket 68 to the right of the position shown in FIG. 4 and will thus cause the lift bar 26 to move to the right. As a result, the ramp member 30 will move to the right. This will cause the ramp member 42 to be elevated and this in turn will cause the roller support member 34 to be elevated. By elevating the roller support member 34, the rollers 38 will be caused to project through the passages 48 to extend above the top face of the upper wall 50 so that they may be used for the purposes of providing a roller conveyor along which items may be conveyed into and out of the load storage compartment of the truck or the like.

When the roller conveyor system is not required, the extensible ram 60 is reactivated to return the lift bar to the original position shown in FIG. 4 and the rollers 36 are lowered to the level of the upper face of the cover 50 so that they are not functional as a conveyor.

From the foregoing, it will be apparent that the present invention provides a simple and inexpensive form of elevatoring roller track assembly which does not require an inflatable bladder.

With the exception of the elevator ramp members, the roller track assembly is preferably made from metal such as steel or the like. The elevator ramp pads are preferably made from a wear-resistant, low-friction plastics material such as nylon or Teflar.

I claim:

1. A self-contained elevating roller track assembly comprising;
   (a) a base member having first and second ends, a longitudinally elongated channel formed in said base member, said channel having a bottom wall, a pair of oppositely disposed side walls and an open upper end, a passage opening through said bottom wall,
   (b) a lift bar located in said channel and slidably mounted on said bottom wall for longitudinal movement relative to the base member, a mounting bracket attached to the lift bar and extending through the passage formed in the bottom wall of the base member,
   (c) first elevator ramp means on said lift bar, said first ramp means having a first ramp face which is inclined upwardly toward the first end of the base member,
   (d) a roller support member slidably mounted in said channel for longitudinal movement therein, said roller support member having a bottom wall overlying said lift bar,
   (e) a plurality of load supporting rollers mounted for rotation on and extending upwardly from said roller support member,
   (f) second elevator ramp means on said bottom wall of said roller support, said second elevator ramp means having a second ramp face which extends parallel to said first ramp face in a face-to-face relationship therewith,
   (g) drive means for driving the lift bar to and fro with respect to the base member to cause said first and second ramp faces to slide over one another to raise or lower the roller support member and its associated rollers as required in use said drive means comprising an extensible ram which has first and second ends, said ram being extensible to move the second end with respect to the first end, the extensible ram being located below the base member, the first end of said ram being mounted on said base member and said second end being mounted on said mounting bracket of said lift bar.

* * * * *